United States Patent
Qiao et al.

(10) Patent No.: US 9,672,517 B2
(45) Date of Patent: Jun. 6, 2017

(54) SYSTEMS, DEVICES AND METHODS FOR ONLINE TRANSACTION VERIFICATION

(71) Applicant: Tencent Technology (Shenzhen) Company Limited, Shenzhen (CN)

(72) Inventors: Xiaochuan Qiao, Shenzhen (CN); Xiaohui Zheng, Shenzhen (CN); Liang Yuan, Shenzhen (CN); Yong Liu, Shenzhen (CN); Sen Wang, Shenzhen (CN); Wenbin Hu, Shenzhen (CN); Yasen Chen, Shenzhen (CN); Jiasheng Qi, Shenzhen (CN); Wei Xu, Shenzhen (CN); Jing Yu, Shenzhen (CN)

(73) Assignee: Tencent Technology (Shenzhen) Company Limited, Shenzhen (CN)

(*) Notice: Subject to any disclaimer, the term of this patent is extended or adjusted under 35 U.S.C. 154(b) by 237 days.

(21) Appl. No.: 14/179,869

(22) Filed: Feb. 13, 2014

(65) Prior Publication Data
US 2014/0164245 A1 Jun. 12, 2014

Related U.S. Application Data

(63) Continuation of application No. PCT/CN2013/082169, filed on Aug. 23, 2013.

(30) Foreign Application Priority Data

Sep. 27, 2012 (CN) .......................... 2012 1 0364954

(51) Int. Cl.
*G06Q 40/00* (2012.01)
*G06Q 20/40* (2012.01)
(Continued)

(52) U.S. Cl.
CPC ....... *G06Q 20/40145* (2013.01); *G06Q 20/12* (2013.01); *G06Q 30/06* (2013.01);
(Continued)

(58) Field of Classification Search
USPC .......................................................... 705/44
See application file for complete search history.

(56) References Cited

U.S. PATENT DOCUMENTS

5,758,322 A * 5/1998 Rongley .............. G06Q 20/341
704/270
6,023,688 A * 2/2000 Ramachandran .... G06Q 20/042
705/40
(Continued)

FOREIGN PATENT DOCUMENTS

| CN | 1689016 A | 10/2005 |
| CN | 101179385 A | 5/2008 |
(Continued)

OTHER PUBLICATIONS

Private sale site shows up fashionably late to the party. (Sep. 7, 2010). PR Newswire Retrieved from https://dialog.proquest.com/professional/professional/docview/750011793?accountid=142257 on Feb. 9, 2017.*

(Continued)

*Primary Examiner* — Kito R Robinson
(74) *Attorney, Agent, or Firm* — Jones Day (57) ABSTRACT

Systems and methods are provided for online transaction verification. For example, a status of a commodity on flash sale is acquired; a verification code associated with the commodity on flash sale is acquired in response to the commodity on flash sale being purchasable; the verification code is output; an input voice password for flash sale is recorded; the voice password for flash sale is uploaded to a server for voice recognition, where order data is processed by the server in response to the uploaded voice password for flash sale matching with a predetermined verification code and a result related to the order data processing is returned; and the result is received and output.

14 Claims, 7 Drawing Sheets

(51) Int. Cl.
*G06Q 20/12* (2012.01)
*G07F 9/02* (2006.01)
*G06Q 30/06* (2012.01)
*G06Q 20/32* (2012.01)
*G06Q 30/02* (2012.01)
*G06Q 20/38* (2012.01)
*G06Q 30/00* (2012.01)

(52) U.S. Cl.
CPC ............ *G07F 9/026* (2013.01); *G06Q 20/32* (2013.01); *G06Q 20/385* (2013.01); *G06Q 20/40* (2013.01); *G06Q 30/00* (2013.01); *G06Q 30/02* (2013.01); *G06Q 30/0609* (2013.01); *G06Q 30/0641* (2013.01)

(56) References Cited

U.S. PATENT DOCUMENTS

| | | | | |
|---|---|---|---|---|
| 6,368,177 | B1* | 4/2002 | Gabai | A63F 13/12 446/298 |
| 6,587,835 | B1* | 7/2003 | Treyz | G06Q 20/12 705/14.64 |
| 9,390,591 | B2* | 7/2016 | Granich | G07F 17/329 |
| 2002/0035474 | A1* | 3/2002 | Alpdemir | G06Q 30/02 704/270 |
| 2003/0046083 | A1* | 3/2003 | Devinney, Jr. | G06Q 20/00 704/273 |
| 2003/0083934 | A1* | 5/2003 | Fostick | G06Q 30/02 705/14.38 |
| 2004/0193425 | A1* | 9/2004 | Tomes | G10L 15/26 704/273 |
| 2005/0015256 | A1* | 1/2005 | Kargman | G06Q 30/06 704/272 |
| 2006/0212355 | A1* | 9/2006 | Teague | G06Q 30/02 705/14.16 |
| 2008/0005064 | A1* | 1/2008 | Sarukkai | G06F 17/241 |
| 2008/0307385 | A1* | 12/2008 | Dreiling | G06F 8/34 717/108 |
| 2010/0293068 | A1* | 11/2010 | Drakoulis | G06Q 40/04 705/26.3 |
| 2012/0030048 | A1* | 2/2012 | Manley | G06Q 30/06 705/26.1 |
| 2012/0192235 | A1* | 7/2012 | Tapley | H04N 21/44016 725/60 |
| 2012/0197720 | A1* | 8/2012 | Bezancon | G06Q 30/0255 705/14.53 |
| 2012/0252579 | A1* | 10/2012 | Sethi | G06Q 30/02 463/40 |
| 2013/0005438 | A1* | 1/2013 | Ocko | G07F 17/3255 463/25 |
| 2013/0139073 | A1* | 5/2013 | Crames | G06F 9/44505 715/760 |
| 2013/0254007 | A1* | 9/2013 | Cockcroft | G06Q 30/02 705/14.25 |
| 2014/0046742 | A1* | 2/2014 | Goodman | G06Q 30/0201 705/14.16 |
| 2014/0195357 | A1* | 7/2014 | Pollack | G06Q 30/0268 705/14.65 |
| 2014/0297390 | A1* | 10/2014 | Grindel | G06Q 30/02 705/14.36 |
| 2015/0112799 | A1* | 4/2015 | Lumer | G06Q 30/00 705/14.53 |
| 2016/0048861 | A1* | 2/2016 | Morgaine | G06Q 30/0207 705/14.16 |
| 2016/0189191 | A1* | 6/2016 | Spalding | G06Q 30/0276 705/14.23 |

FOREIGN PATENT DOCUMENTS

| | | | |
|---|---|---|---|
| CN | 101470880 A | 7/2009 | |
| CN | 201345114 Y | 11/2009 | |
| CN | 102393931 A | 3/2012 | |
| CN | 102903054 A | 1/2013 | |
| GB | 2276746 A | 10/1994 | |
| WO | WO 0130058 A2 * | 4/2001 | ............ G06Q 30/06 |

OTHER PUBLICATIONS

Amy Martinez, & Seattle Times, b. r. (May 20, 2011). Flash-sale site zulily is moving to sodo. The Seattle Times (Seattle, WA) Retrieved from https://dialog.proquest.com/professional/professional/docview/868280584?accountid=142257 on Feb. 9, 2017.*

China Patent Office, Office Action issued Sep. 25, 2014, in Application No. 201210364954.1.

China Patent Office, Office Action issued Jan. 27, 2015, in Application No. 201210364954.1.

Patent Cooperation Treaty, International Search Report & Written Opinion of the International Searching Authority, PCT/CN2013/082169, mailed Nov. 28, 2013.

Patent Cooperation Treaty, International Preliminary Report on Patentability, PCT/CN2013/082169, issued Mar. 31, 2015.

* cited by examiner

SYSTEMS, DEVICES AND METHODS FOR ONLINE TRANSACTION VERIFICATION

CROSS-REFERENCES TO RELATED APPLICATIONS

This application is a continuation of International Application No. PCT/CN2013/082169, with an international filing date of Aug. 23, 2013, now pending, which claims priority to Chinese Patent Application No. 201210364954.1, filed Sep. 27, 2012, both applications being incorporated by reference herein for all purposes.

BACKGROUND OF THE INVENTION

The present disclosure is directed to computer technology. More particularly, the present disclosure provides systems and methods for computer networks. Merely by way of example, the present disclosure has been applied to network activities. But it would be recognized that the present disclosure has a much broader range of applicability.

As the competition among various e-commerce platforms increases, flash sale has been frequently used to boost sales. E-commerce platforms often offer certain selected commodities for flash sale at a below-market price, in order to retain existing customers and attract new customers.

Many mainstream e-commerce platforms usually have many flash sale activities for personal computer (PC) users. However, only a few e-commerce platforms provide flash sale functions for tablets or mobile phone application programs (i.e., apps). The ordering process for commodities on flash sale is similar to that for regular commodities. The only major difference is that flash-sale commodities are often not processed through a shopping-cart process.

Flash-sale functions for mobile phone apps may increase user adhesion. However, the commodities on flash sale for mobile phone users often do not have special discounts. Direct purchasing without verification may not negatively affect user experience too much. But if commodities with special discounts are provided for mobile phone users, verification is often needed. It may be easy to enter a verification code at a personal computer, but it is usually tedious to input the verification code at a mobile phone so that a user may easily feel frustrated during the process.

Presently, most flash sale events utilize a text or image verification code to prevent cheating in flash sale. Specifically, a verification step is often added to the ordering process. However, inserting the verification step to the ordering process may cause interruption to the ordering process and negatively affect the user experience. In addition, it is often cumbersome to manually enter the verification code using a mobile phone, and input errors frequently occur. Thus, requiring a verification code for mobile phone transactions may often result in user frustration and negatively affect the user experience of the flash sale process.

Some e-commerce platforms omit the verification step for flash sale to provide direct purchasing of commodities on flash sale without verification. When there is a large inventory of commodities on flash sale, user experience may not be negatively affected. However, when the commodities on flash sale are rare, all of the commodities on flash sale may be snapped up in a short period of time by only a small number of customers, and other customers cannot benefit from the flash sale.

Hence it is highly desirable to improve the techniques for online transaction verification.

BRIEF SUMMARY OF THE INVENTION

According to one embodiment, a method is provided for online transaction verification. For example, a status of a commodity on flash sale is acquired; a verification code associated with the commodity on flash sale is acquired in response to the commodity on flash sale being purchasable; the verification code is output; an input voice password for flash sale is recorded; the voice password for flash sale is uploaded to a server for voice recognition, where order data is processed by the server in response to the uploaded voice password for flash sale matching with a predetermined verification code and a result related to the order data processing is returned; and the result is received and output.

According to another embodiment, a method is provided for online transaction verification. For example, a verification code associated with a commodity on flash sale is predetermined; a status of the commodity on flash sale is returned based on at least information associated with a first request from a client; the verification code is returned in response to the commodity on flash sale being purchasable; a voice password for flash sale uploaded from the client is received; voice recognition is performed; order data is processed in response to the voice password for flash sale matching with the verification code; and a result related to the order data processing is returned to the client.

According to yet another embodiment, a method is provided for online transaction verification. For example, a client acquires a status of a commodity on flash sale from a server; the client acquires a verification code associated with the commodity on flash sale from the server in response to the commodity on flash sale being purchasable; the client outputs the verification code; the client records an input voice password for flash sale; the client uploads the voice password for flash sale to the server for voice recognition; the server processes order data in response to the uploaded voice password for flash sale matching with a predetermined verification code on the server; the server returns a result related to the order data processing to the client; and the client receives and outputs the result.

According to yet another embodiment, a device for online transaction verification includes a status-acquisition unit, a verification-code-acquisition unit, an output unit, a recording unit, an uploading unit, and a result-output unit. The status-acquisition unit is configured to acquire a status of a commodity on flash sale. The verification-code-acquisition unit is configured to acquire a verification code associated with the commodity on flash sale in response to the commodity on flash sale being purchasable. The output unit is configured to output the verification code. The recording unit is configured to record an input voice password for flash sale. The uploading unit is configured to upload the voice password for flash sale to a server for voice recognition, where order data is processed by the server in response to the uploaded voice password for flash sale matching with a predetermined verification code and a result related to the order data processing is returned. The result-output unit is configured to receive the result and output the result.

In one embodiment, a device for online transaction verification includes a verification-code-predetermination unit, a first returning unit, a second returning unit, a voice-password-reception unit, a voice-recognition unit, an order-data-processing unit and a third returning unit. The verification-code-predetermination unit is configured to predetermine a verification code associated with a commodity on flash sale. The first returning unit is configured to return a status of the commodity on flash sale based on at least information associated with a first request from a client. The second returning unit is configured to, in response to the commodity on flash sale being purchasable, return the verification code. The voice-password-reception unit is configured to, in response to the commodity on flash sale being purchasable, receive a voice password for flash sale uploaded from the client. The voice-recognition unit is configured to perform voice recognition. The order-data-processing unit is configured to in response to the voice password for flash sale matching with the verification code, process order data. The third returning unit is configured to return a result related to the order data processing to the client.

In another embodiment, a system for online transaction verification includes a client and a verification server. The client is configured to, acquire a status of a commodity on flash sale from a server, acquire a verification code associated with the commodity on flash sale from the server in response to the commodity on flash sale being purchasable, and output the verification code. The client is further configured to, record an input voice password for flash sale, upload the voice password for flash sale to the server for voice recognition, receive a result related to the server processing order data, and output the result. The server is configured to, process the order data in response to the uploaded voice password for flash sale matching with a predetermined verification code on the server, and return the result related to the order data processing to the client.

In yet another embodiment, a non-transitory computer readable storage medium includes programming instructions for online transaction verification. The programming instructions are configured to cause one or more data processors to execute certain operations. For example, a status of a commodity on flash sale is acquired; a verification code associated with the commodity on flash sale is acquired in response to the commodity on flash sale being purchasable; the verification code is output; an input voice password for flash sale is recorded; the voice password for flash sale is uploaded to a server for voice recognition, where order data is processed by the server in response to the uploaded voice password for flash sale matching with a predetermined verification code and a result related to the order data processing is returned; and the result is received and output.

In yet another embodiment, a non-transitory computer readable storage medium includes programming instructions for online transaction verification. The programming instructions are configured to cause one or more data processors to execute certain operations. For example, a verification code associated with a commodity on flash sale is predetermined; a status of the commodity on flash sale is returned based on at least information associated with a first request from a client; the verification code is returned in response to the commodity on flash sale being purchasable; a voice password for flash sale uploaded from the client is received; voice recognition is performed; order data is processed in response to the voice password for flash sale matching with the verification code; and a result related to the order data processing is returned to the client.

For example, the systems and methods described herein are configured to assist a user to accomplish a flash sale transaction through a verification process using the user's voice input, and to directly process order data if the user has set up a delivery address, so that the entire flash sale transaction can be carried out smoothly and easily.

Depending upon embodiment, one or more benefits may be achieved. These benefits and various additional objects, features and advantages of the present disclosure can be fully appreciated with reference to the detailed description and accompanying drawings that follow.

BRIEF DESCRIPTION OF THE DRAWINGS

FIG. 2($a$) and FIG. 2($b$) are simplified diagrams showing a method for online transaction verification according to certain embodiments of the present disclosure;

DETAILED DESCRIPTION OF THE INVENTION

Figure 1:
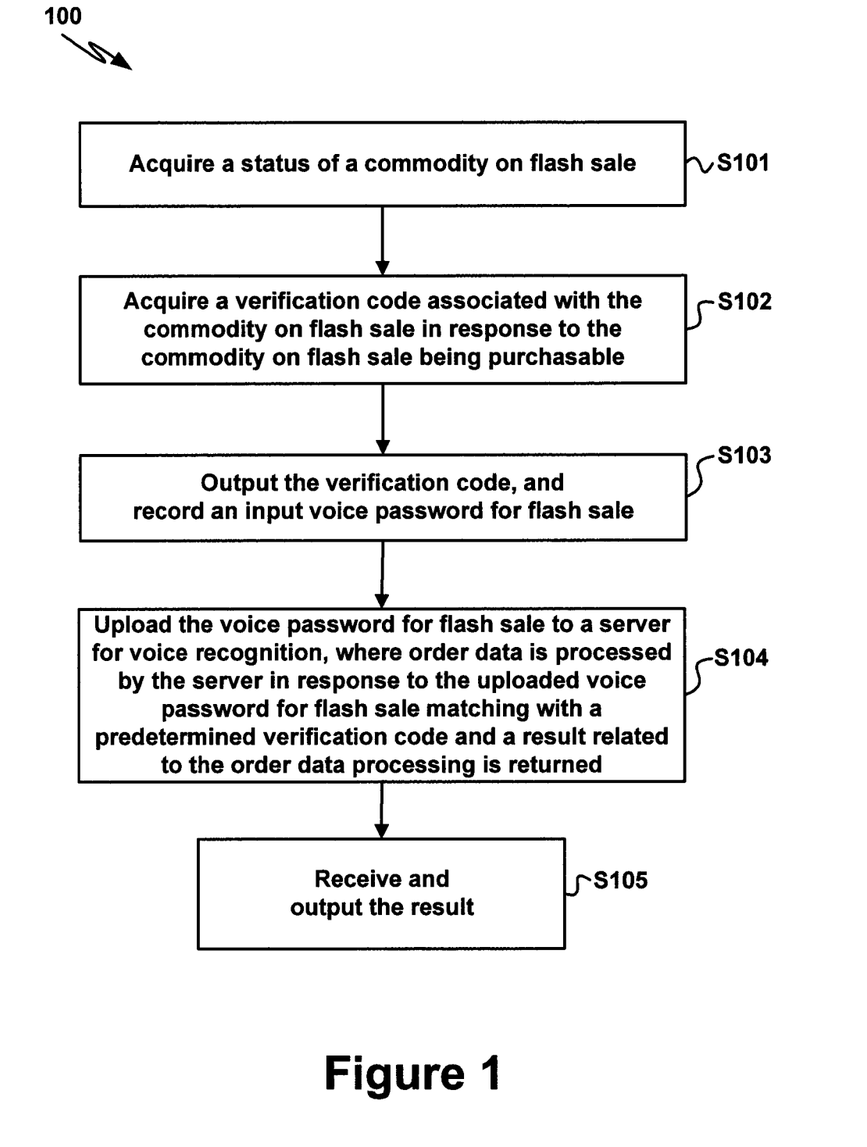
FIG. 1 is a simplified diagram showing a method for online transaction verification according to one embodiment of the present disclosure.

FIG. 1 is a simplified diagram showing a method for online transaction verification according to one embodiment of the present disclosure. This diagram is merely an example, which should not unduly limit the scope of the claims. One of ordinary skill in the art would recognize many variations, alternatives, and modifications. The method 100 includes at least the process S101 for acquiring a status of a commodity on flash sale, the process S102 for acquiring a verification code associated with the commodity on flash sale in response to the commodity on flash sale being purchasable, and the process S103 for outputting the verification code and recording an input voice password for flash sale. In addition, the method 100 includes the process S104 for uploading the voice password for flash sale to a server for voice recognition, and the process S105 for receiving and outputting a result related to order data processing. For example, one or more processes of the method 100 are performed by a client which may include a smart phone, a tablet, a laptop computer or a desktop computer.

According to one embodiment, at the process S101, a client sends a request to inquire about the status of the commodity on flash sale to a server. For example, the server responds to the client request and returns the status of the commodity on flash sale. Then, the client acquires the status of the commodity on flash sale. As an example, at the process S102, the server predetermines a verification code for each of the commodities on flash sale. In another example, if the commodity on flash sale is in a purchasable status, the client acquires a verification code corresponding to the commodity on flash sale from the server. For example, at the process S103, after acquiring the verification code associated with the commodity on flash sale, the client outputs the verification code through a user interface. In another example, the user provides a voice password for flash sale based on the verification code, e.g., by shouting. As an example, the client records the input voice password for flash sale.

According to another embodiment, at the process S104, the voice password for flash sale is uploaded to the server for voice recognition. For example, the server processes order data if the uploaded voice password for flash sale matches with the predetermined verification code. In another example, a result of the order data processing is returned. As an example, at the process S105, the result of the order data processing is received and output by the client. In another example, whether the user's order for the commodity on flash sale has been successfully processed is displayed. In yet another example, if the order has been successfully processed, details of the order may be displayed.

In one embodiment, before the process S101, a process for uploading user authentication information to the server for user authentication is executed. Specifically, as an example, the user logs in at the client before purchasing the commodity on flash sale, and then the client uploads the user authentication information to the server for user authentication.

In another embodiment, before the process S101, a process for uploading a delivery address to the server is executed. For example, when the user logs in, a prompt is provided to the user for setting a delivery address if the user has not set such a delivery address. In another example, the client uploads the delivery address of the user to the server.

In yet another embodiment, the process S103 includes: displaying an interface for inputting the voice password for flash sale, the interface including the verification code and a button for flash sale, and recording the voice password for flash sale in response to the button for flash sale being pressed. For example, the method 100 may include one or more processes of a method 150 as shown in FIG. 2(a) and FIG. 2(b).

Figure 2A:
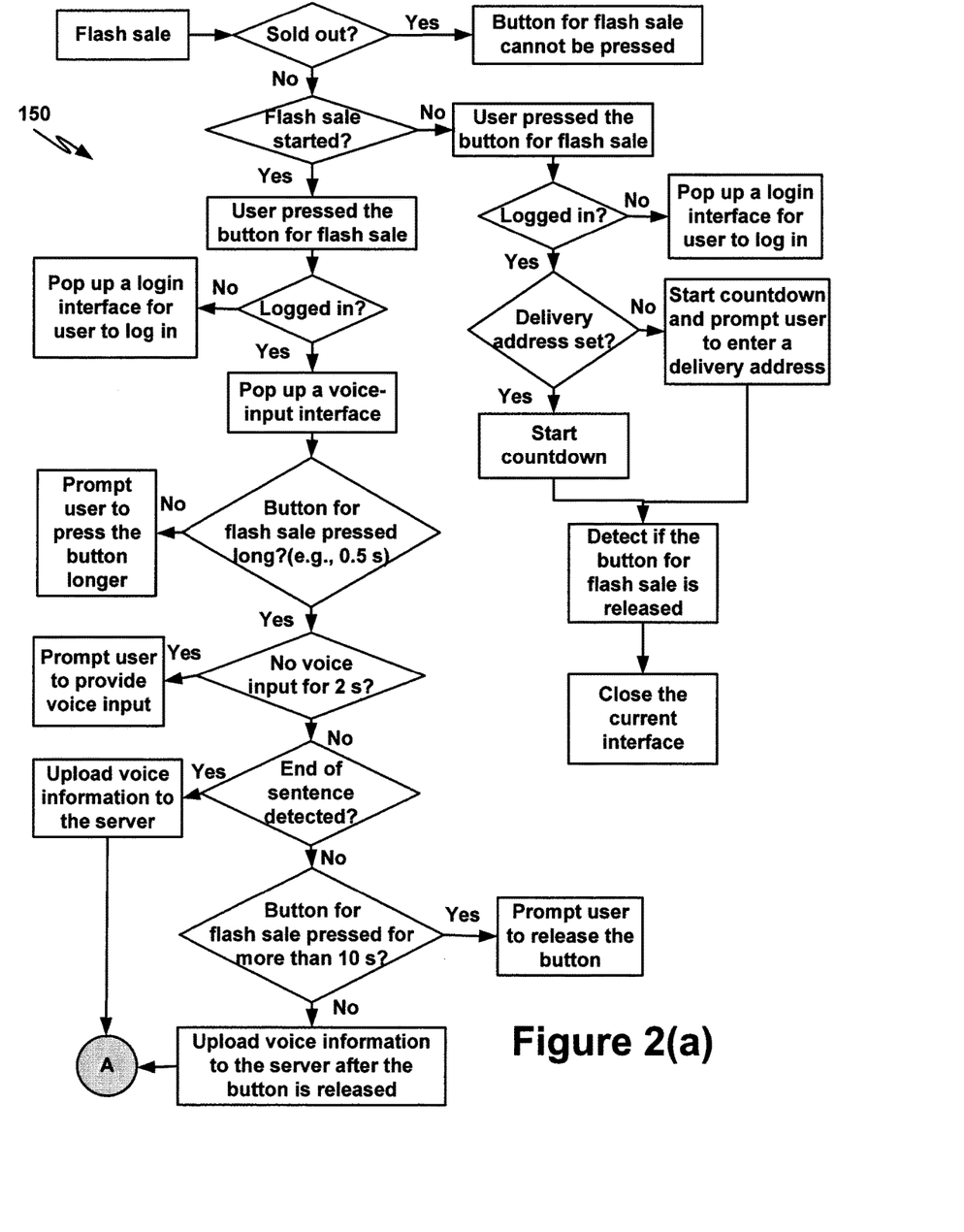
Figure 2B:
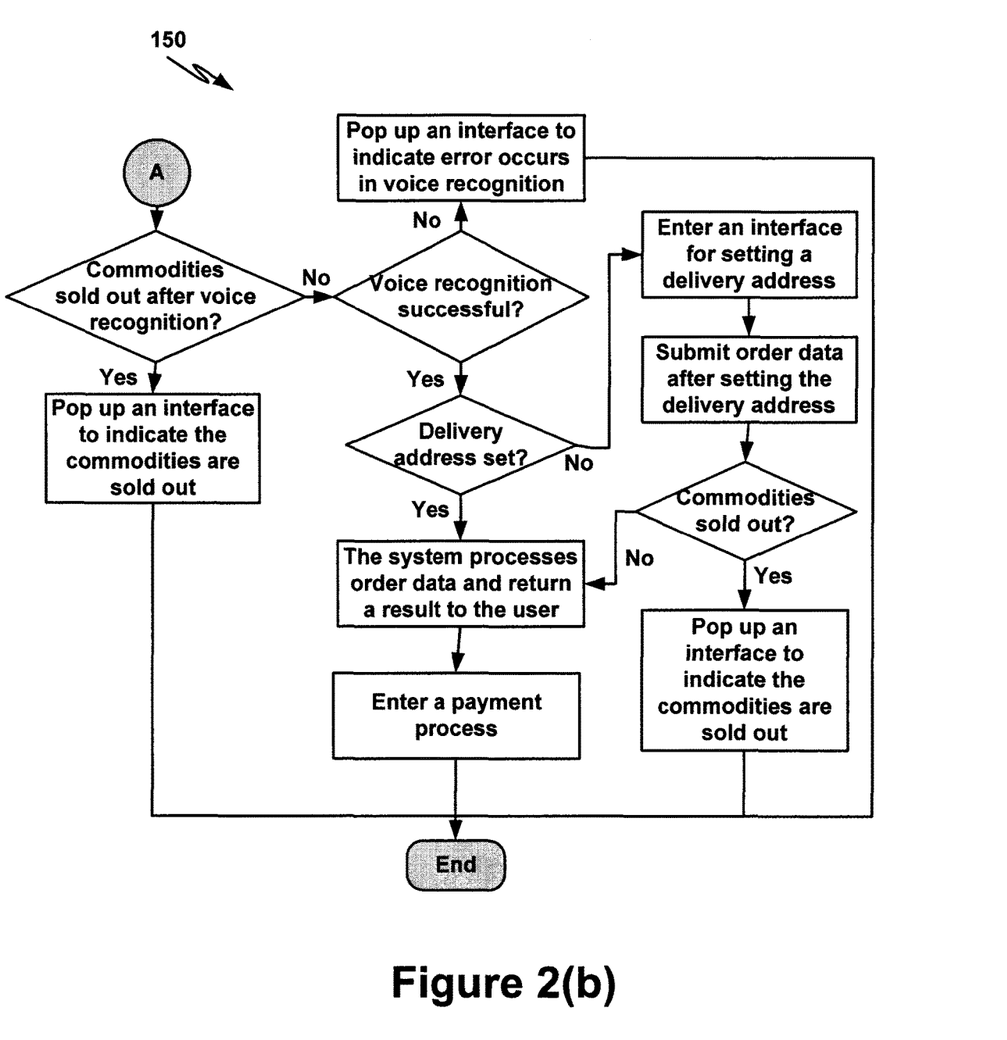

FIG. 2(a) and FIG. 2(b) are simplified diagrams showing a method for online transaction verification according to certain embodiments of the present disclosure. These diagrams are merely examples, which should not unduly limit the scope of the claims. One of ordinary skill in the art would recognize many variations, alternatives, and modifications.

According to one embodiment, when certain commodities are on flash sale, a client inquires of a server about the status of a commodity on flash sale. For example, the client sends a request to the server for the status of the commodity on flash sale. As an example, the server responds to the client's request and returns the status of the commodity on flash sale. Then the client acquires the status of the commodity on flash sale.

According to another embodiment, if the commodity on flash sale is sold out, a button for the commodity on flash sale is deactivated and the button does not function even if it is pressed. For example, a user may enter a webpage with a detailed description of the commodity on flash sale when the user clicks on the button for the commodity on flash sale.

According to yet another embodiment, if the flash sale of the commodity has not begun, the client detects whether a user has logged in when the user clicks on the button for the commodity on flash sale. For example, if the user has logged in, subsequent processes may be executed. In another example, if the user has not logged in, a login interface pops up to prompt the user to perform certain login operations.

In one embodiment, if the user has logged in, the client detects if the user has set a delivery address. For example, if the delivery address has been set, a countdown interface is displayed to indicate a time when the commodity becomes purchasable. In another example, if the delivery address has not been set, the countdown interface may also be displayed to indicate the time when the commodity becomes purchasable. In yet another example, the user may be prompted to set the delivery address for subsequent processes. As an example, the user can select at the client a delivery address pre-stored in the server, or enter a new delivery address from the client. As another example, after the user selects or enters a delivery address, the client uploads related information to the server. As yet another example, the countdown interface may be closed if the button for the commodity on flash sale is released.

In another embodiment, if the flash sale for the commodity has begun, the client detects whether the user has logged in when the user clicks on the button for the commodity on flash sale. For example, if the user has not logged in, a login interface pops up to prompt the user to log in, and the user authentication information is uploaded to the server for user authentication. In another example, if the user has logged in, the client acquires a verification code associated with the commodity on flash sale, and outputs the verification code on an interface for inputting a voice password for flash sale, as shown in FIG. 3.

Figure 3:
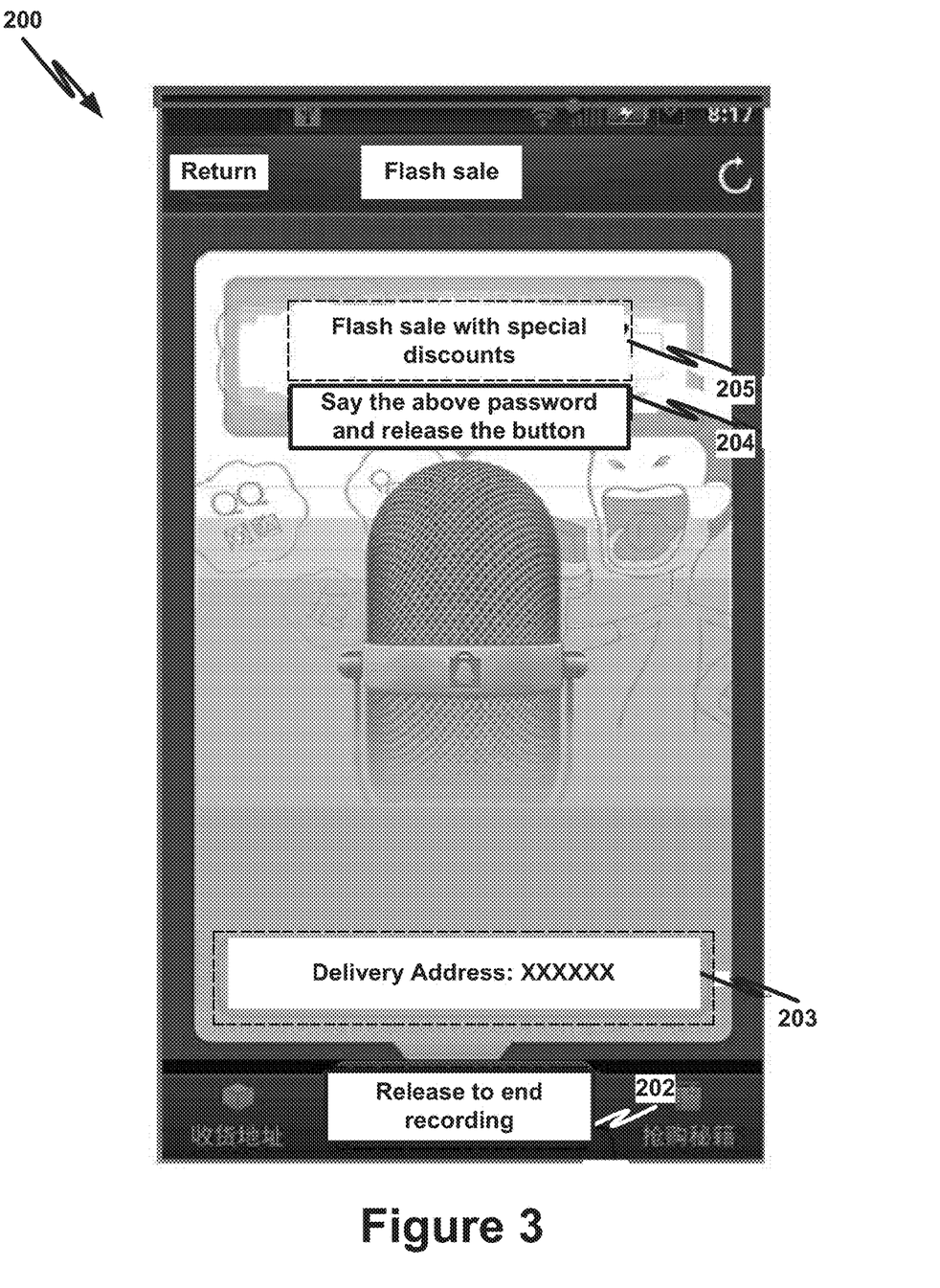
FIG. 3 is a simplified diagram showing an interface for inputting a voice password for flash sale according to one embodiment of the present disclosure.

FIG. 3 is a simplified diagram showing an interface for inputting a voice password for flash sale according to one embodiment of the present disclosure. This diagram is merely an example, which should not unduly limit the scope of the claims. One of ordinary skill in the art would recognize many variations, alternatives, and modifications. As shown in FIG. 3, the interface 200 includes a verification code 205, a button for flash sale 202, a delivery address 203 and an operation prompt 204.

According to one embodiment, the verification code 205 is at a top portion of the interface 200, and represents a password for flash sale which a user provides, e.g., through shouting. For example, "flash sale with special discounts," as shown in FIG. 3, corresponds to the verification code for a commodity on flash sale. As an example, such a verification code is predetermined by a server. In another example, the button for flash sale 202 is in the middle of a bottom portion of the interface, and the client begins to record an input voice password for flash sale when the button for flash sale 202 is pressed. In yet another example, the delivery address 203 is shown right above the button for flash sale 202. The delivery address 203 appears in the interface 200 when the user has set such a delivery address, in some embodiments. The operation prompt 204 may be located below the verification code 205 to prompt the user to perform corresponding operations. As an example, the operation prompt 204 prompts the user to shout out the password for flash sale and release the button for flash sale 202 thereafter.

According to another embodiment, when the user presses the button for flash sale 202, the client detects whether the user presses the button for flash sale 202 for a predetermined time period (e.g., 0.5 second). For example, if the button for flash sale 202 has been pressed for less than 0.5 second, the client prompts the user to press the button longer through the interface 200. In another example, if the client detects the user has pressed the button for flash sale 202 long enough (i.e., longer than 0.5 second), the client begins the recordation operations to record the voice password from the user.

According to yet another embodiment, during the recordation process, the client analyzes the recorded content. For example, if no effective voice input has been detected for more than 2 seconds during the recordation process (e.g., the user does not shout out the voice password or the user's voice is too low), a prompt for voice input or louder voice is provided to the user through the interface 200.

In one embodiment, when effective voice input has been detected, an end-of-sentence detection begins. For example, a pause after the detected voice input may indicate that the user has finished a sentence. As an example, if the end-of-sentence detection is successfully performed, related voice information is uploaded to the server. On the other hand, if the end-of-sentence detection is not successfully performed, it is determined whether the button for flash sale 202 has been pressed for longer than a predetermined threshold (e.g., 10 seconds). If it is more than the predetermined threshold, the user is prompted to release the button 202, or the voice recording operations automatically end. For example, after the button for flash sale 202 is released or the voice recording operations automatically end, the voice information is uploaded to the server for voice recognition.

In another embodiment, the server receives the voice information from the client, and determines whether the commodity on flash sale has been sold out. For example, if the commodity on flash sale has been sold out, the server returns the information related to the commodity being sold out to the client. The client displays a prompt, for example, in an interface that pops up, to indicate that the commodity on flash sale is sold out. As an example, the prompt interface is closed upon a user click or automatically closed after a predetermined time period (e.g., three seconds), and the current webpage is refreshed automatically after the prompt interface is closed.

In yet another embodiment, if the commodity on flash sale has not been sold out yet, the server performs voice recognition. For example, if the voice recognition is not successful (i.e. the recorded voice password for flash sale does not match with the predetermined verification code), the server returns the result and an interface pops up at the client to indicate that the voice password is wrong. On the other hand, if the voice recognition is successful (i.e. the recorded password matches with the predetermined verification code), the server places the order for the user (i.e., process the order data).

Specifically, the server determines if the user has set a delivery address, in some embodiments. For example, if the user has set a delivery address, the server generates an order based on at least information associated with the delivery address and returns the order processing result to the client. In another example, the client receives and outputs the result to the user, and the user enters a payment process to complete the entire flash sale transaction.

In certain embodiments, if the voice recognition is successful but the user has not set a delivery address, the server returns a request for setting a delivery address to the client, and the client pops up an interface for setting the delivery address. For example, when the user finishes setting the delivery address, the client submits the order to the server. In another example, the server determines whether the commodity on flash sale has been sold out. If the commodity has been sold out, the client pops up an interface to indicate that the commodity is sold out. If the commodity is still on sale, the server automatically processes the order data in the background and returns the order processing result to the user at the client.

Figure 4:
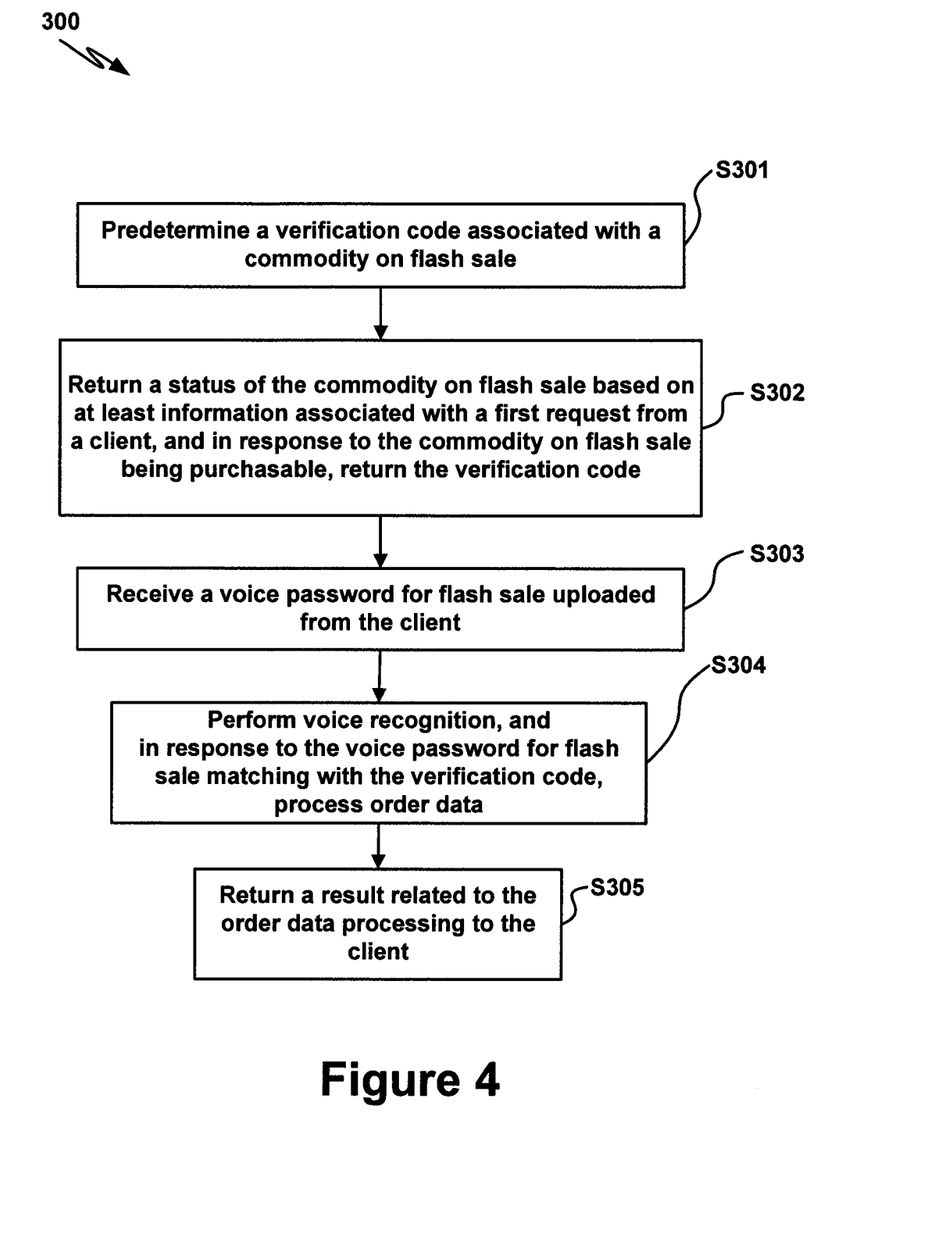
FIG. 4 is a simplified diagram showing a method for online transaction verification according to another embodiment of the present disclosure.

FIG. 4 is a simplified diagram showing a method for online transaction verification according to another embodiment of the present disclosure. This diagram is merely an example, which should not unduly limit the scope of the claims. One of ordinary skill in the art would recognize many variations, alternatives, and modifications. The method 300 includes at least the process S301 for predetermining a verification code associated with a commodity on flash sale, the process S302 for returning a status of the commodity on flash sale based on at least information associated with a first request from a client, and in response to the commodity on flash sale being purchasable, returning the verification code, the process S303 for receiving a voice password for flash sale uploaded from the client, the process S304 for performing voice recognition, and in response to the voice password for flash sale matching with the verification code, processing order data, and the process S305 for returning a result related to the order data processing to the client. For example, one or more processes of the method 300 are executed by a server.

According to one embodiment, at the process S301, the server predetermines a verification code associated with a commodity on flash sale. For example, at the process S302, the client sends a request to inquire about the status of the commodity on flash sale to a server, and the server responds to the client request and returns the status of the commodity on flash sale. Thus, the client acquires the status of the commodity on flash sale. As an example, if the commodity is in a purchasable status, the server returns the verification code to the client, and the client acquires from the server the verification code associated with the commodity on flash sale.

According to another embodiment, at the process S303, after acquiring the verification code associated with the commodity on flash sale, the client outputs the verification code through an interface, and the user shouts out a password for flash sale based on at least information associated with the verification code. For example, the client records the voice password for flash sale uttered by the user and uploads the voice password to the server. As an example, the server receives the voice password uploaded from the client.

According to yet another embodiment, at the process S304, the server performs voice recognition of the uploaded password for flash sale and processes the order data if the voice password for flash sale matches with the verification code predetermined by the server. For example, the method 300 may include one or more processes of the method 150 as shown in FIG. 2(a) and FIG. 2(b).

Figure 5:
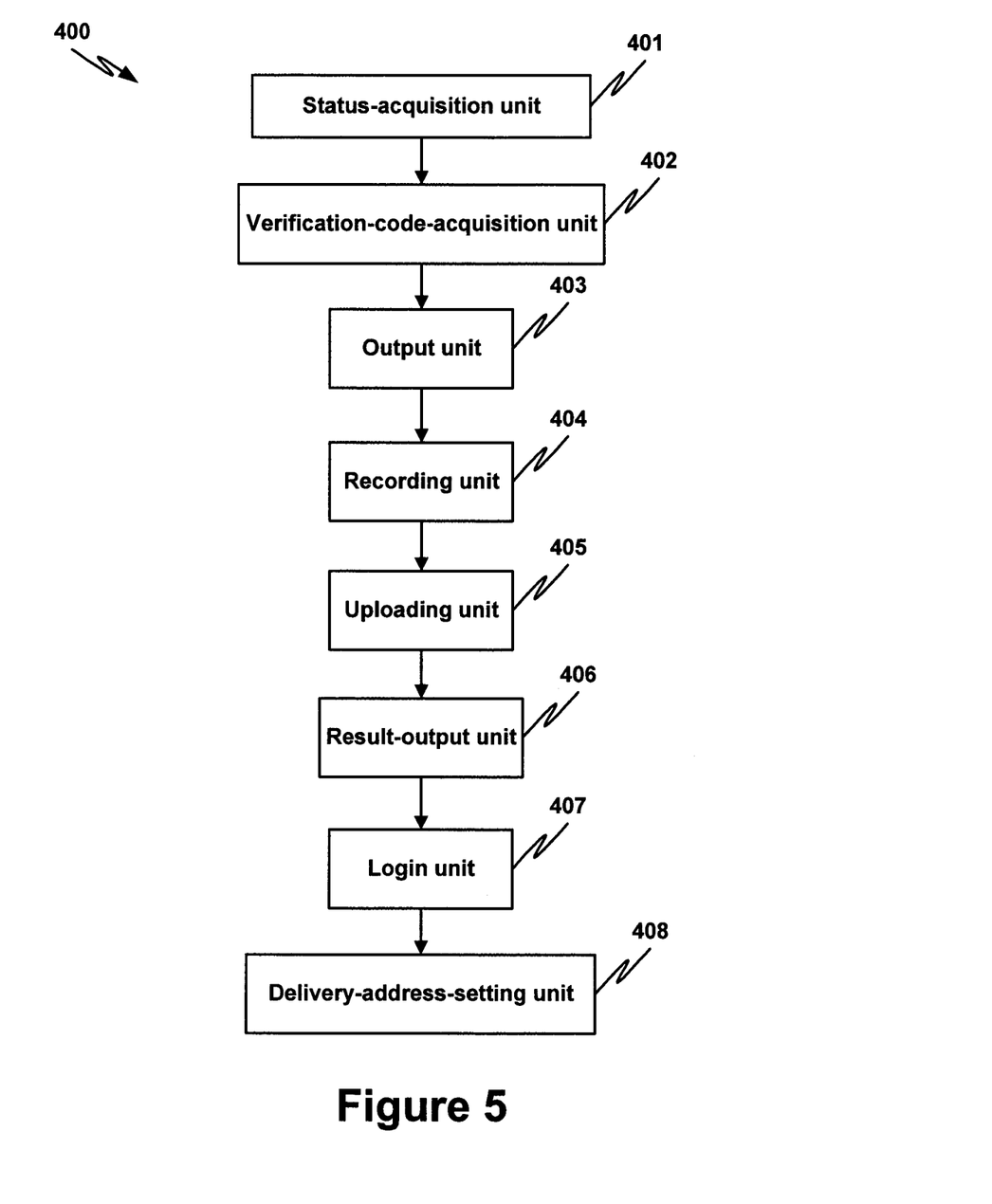
FIG. 5 is a simplified diagram showing a device for online transaction verification according to one embodiment of the present disclosure.

FIG. 5 is a simplified diagram showing a device for online transaction verification according to one embodiment of the present disclosure. This diagram is merely an example, which should not unduly limit the scope of the claims. One of ordinary skill in the art would recognize many variations, alternatives, and modifications. The device 400 includes at least a status-acquisition unit 401, a verification-code-acquisition unit 402, an output unit 403, a recording unit 404, an uploading unit 405 and a result-output unit 406.

According to one embodiment, the status-acquisition unit 401 is configured to acquire a status of a commodity on flash sale, and the verification-code-acquisition unit 402 is configured to acquire a verification code associated with the commodity on flash sale in response to the commodity on flash sale being purchasable, and the output unit 403 is configured to output the verification code. For example, the recording unit 404 is configured to record an input voice password for flash sale, and the uploading unit 405 is configured to upload the voice password for flash sale to a server for voice recognition, where order data is processed by the server in response to the uploaded voice password for flash sale matching with a predetermined verification code and a result related to the order data processing is returned. In another example, the result-output unit 406 is configured to receive and output the result.

According to another embodiment, the device 400 further includes a login unit 407 configured to perform a login operation, e.g., before the status-acquisition unit 401 acquires the status of the commodity on flash sale. For example, the device 400 further includes a delivery-address-setting unit 408 configured to set a delivery address. In another example, the delivery-address-setting unit 408 selects a delivery address pre-stored in the server by the user or acquires the delivery address directly entered by the user. The device 400 performs operations for online transaction verification according to the method 100, and/or the method 150, in certain embodiments.

Figure 6:
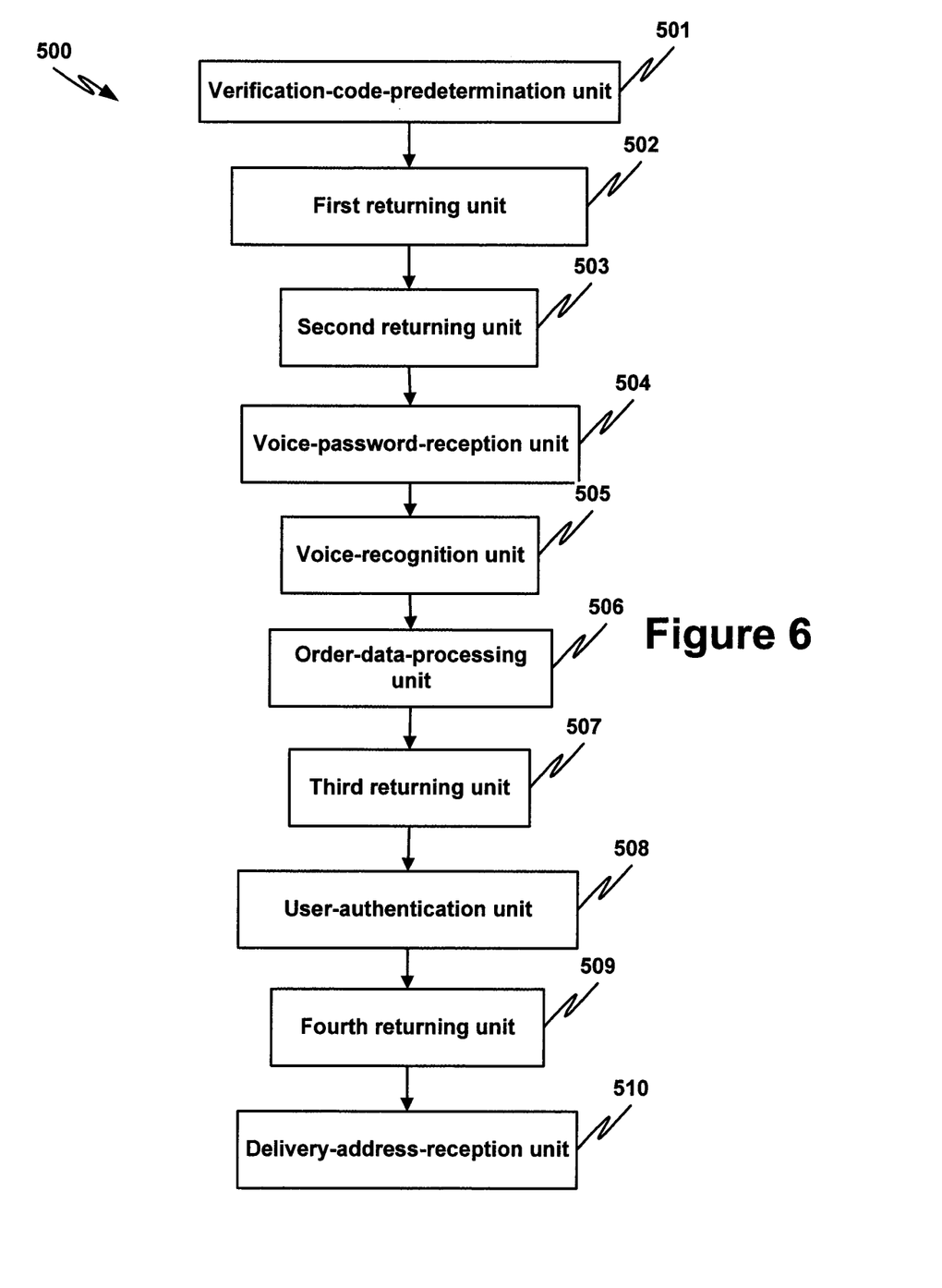
FIG. 6 is a simplified diagram showing a device for online transaction verification according to another embodiment of the present disclosure.

FIG. 6 is a simplified diagram showing a device for online transaction verification according to another embodiment of the present disclosure. This diagram is merely an example, which should not unduly limit the scope of the claims. One of ordinary skill in the art would recognize many variations, alternatives, and modifications. The device 500 includes at least a verification-code-predetermination unit 501, a first returning unit 502, a second returning unit 503, a voice-password-reception unit 504, a voice-recognition unit 505, an order-data-processing unit 506 and a third returning unit 507.

According to one embodiment, the verification-code-predetermination unit 501 is configured to predetermine a verification code associated with a commodity on flash sale, the first returning unit 502 is configured to return a status of the commodity on flash sale based on at least information associated with a first request from a client, and the second returning unit 503 is configured to, in response to the commodity on flash sale being purchasable, return the verification code. For example, the voice-password-reception unit 504 is configured to, in response to the commodity on flash sale being purchasable, receive a voice password for flash sale uploaded from the client, the voice-recognition unit 505 is configured to perform voice recognition, the order-data-processing unit 506 is configured to in response to the voice password for flash sale matching with the verification code, process order data, and the third returning unit 507 is configured to return a result related to the order data processing to the client.

According to another embodiment, the device 500 further includes a user-authentication unit 508 configured to receive user authentication information uploaded from the client and perform user authentication based on at least information associated with the user authentication information. For example, the device 500 also includes a fourth returning unit 509 configured to, in response to a second request from the client, return a time when the commodity on flash sale becomes purchasable. In another example, the device additionally includes a delivery-address-reception unit 510 configured to receive a delivery address uploaded from the client and process the order data based on at least information associated with the delivery address. The device 500 performs operations for online transaction verification according to the method 300, in some embodiments.

According to certain embodiments, a system for online transaction verification includes both the device 400 (e.g., a client) and the device 500 (e.g., a server), and performs the online transaction verification according to the method 100, the method 150, and/or the method 300.

According to one embodiment, a method is provided for online transaction verification. For example, a status of a commodity on flash sale is acquired; a verification code associated with the commodity on flash sale is acquired in response to the commodity on flash sale being purchasable; the verification code is output; an input voice password for flash sale is recorded; the voice password for flash sale is uploaded to a server for voice recognition, where order data is processed by the server in response to the uploaded voice password for flash sale matching with a predetermined verification code and a result related to the order data processing is returned; and the result is received and output. For example, the method is implemented according to at least FIG. 1, and/or FIGS. 2(*a*) and 2(*b*).

According to another embodiment, a method is provided for online transaction verification. For example, a verification code associated with a commodity on flash sale is predetermined; a status of the commodity on flash sale is returned based on at least information associated with a first request from a client; the verification code is returned in response to the commodity on flash sale being purchasable; a voice password for flash sale uploaded from the client is received; voice recognition is performed; order data is processed in response to the voice password for flash sale matching with the verification code; and a result related to the order data processing is returned to the client. For example, the method is implemented according to at least FIG. 4.

According to yet another embodiment, a method is provided for online transaction verification. For example, a client acquires a status of a commodity on flash sale from a server; the client acquires a verification code associated with the commodity on flash sale from the server in response to the commodity on flash sale being purchasable; the client outputs the verification code; the client records an input voice password for flash sale; the client uploads the voice password for flash sale to the server for voice recognition; the server processes order data in response to the uploaded voice password for flash sale matching with a predetermined verification code on the server; the server returns a result related to the order data processing to the client; and the client receives and outputs the result. For example, the method is implemented according to at least FIG. 1, FIGS. 2(*a*) and 2(*b*), and/or FIG. 4.

According to yet another embodiment, a device for online transaction verification includes a status-acquisition unit, a verification-code-acquisition unit, an output unit, a recording unit, an uploading unit, and a result-output unit. The status-acquisition unit is configured to acquire a status of a commodity on flash sale. The verification-code-acquisition unit is configured to acquire a verification code associated with the commodity on flash sale in response to the commodity on flash sale being purchasable. The output unit is configured to output the verification code. The recording unit is configured to record an input voice password for flash sale. The uploading unit is configured to upload the voice password for flash sale to a server for voice recognition, where order data is processed by the server in response to the uploaded voice password for flash sale matching with a predetermined verification code and a result related to the order data processing is returned. The result-output unit is configured to receive the result and output the result. For example, the device is implemented according to at least FIG. 1, FIGS. 2(*a*) and 2(*b*), and/or FIG. 5.

In one embodiment, a device for online transaction verification includes a verification-code-predetermination unit, a first returning unit, a second returning unit, a voice-password-reception unit, a voice-recognition unit, an order-data-processing unit and a third returning unit. The verification-code-predetermination unit is configured to predetermine a verification code associated with a commodity on flash sale. The first returning unit is configured to return a status of the commodity on flash sale based on at least information associated with a first request from a client. The second returning unit is configured to, in response to the commodity on flash sale being purchasable, return the verification code. The voice-password-reception unit is configured to, in response to the commodity on flash sale being purchasable, receive a voice password for flash sale uploaded from the client. The voice-recognition unit is configured to perform voice recognition. The order-data-processing unit is configured to in response to the voice password for flash sale matching with the verification code, process order data. The third returning unit is configured to return a result related to the order data processing to the client. For example, the device is implemented according to at least FIG. 4, and/or FIG. 6.

In another embodiment, a system for online transaction verification includes a client and a verification server. The client is configured to, acquire a status of a commodity on flash sale from a server, acquire a verification code associated with the commodity on flash sale from the server in response to the commodity on flash sale being purchasable, and output the verification code. The client is further configured to, record an input voice password for flash sale, upload the voice password for flash sale to the server for voice recognition, receive a result related to the server processing order data, and output the result. The server is configured to, process the order data in response to the uploaded voice password for flash sale matching with a predetermined verification code on the server, and return the result related to the order data processing to the client. For example, the system is implemented according to at least FIG. 1, FIGS. 2(a) and 2(b), FIG. 4, FIG. 5, and/or FIG. 6.

In yet another embodiment, a non-transitory computer readable storage medium includes programming instructions for online transaction verification. The programming instructions are configured to cause one or more data processors to execute certain operations. For example, a status of a commodity on flash sale is acquired; a verification code associated with the commodity on flash sale is acquired in response to the commodity on flash sale being purchasable; the verification code is output; an input voice password for flash sale is recorded; the voice password for flash sale is uploaded to a server for voice recognition, where order data is processed by the server in response to the uploaded voice password for flash sale matching with a predetermined verification code and a result related to the order data processing is returned; and the result is received and output. For example, the storage medium is implemented according to at least FIG. 1, and/or FIGS. 2(a) and 2(b).

In yet another embodiment, a non-transitory computer readable storage medium includes programming instructions for online transaction verification. The programming instructions are configured to cause one or more data processors to execute certain operations. For example, a verification code associated with a commodity on flash sale is predetermined; a status of the commodity on flash sale is returned based on at least information associated with a first request from a client; the verification code is returned in response to the commodity on flash sale being purchasable; a voice password for flash sale uploaded from the client is received; voice recognition is performed; order data is processed in response to the voice password for flash sale matching with the verification code; and a result related to the order data processing is returned to the client. For example, the storage medium is implemented according to at least FIG. 4.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present disclosure each are, individually and/or in combination with at least another component, implemented using one or more software components, one or more hardware components, and/or one or more combinations of software and hardware components. In another example, some or all components of various embodiments of the present disclosure each are, individually and/or in combination with at least another component, implemented in one or more circuits, such as one or more analog circuits and/or one or more digital circuits. In yet another example, various embodiments and/or examples of the present disclosure can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present disclosure have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method operating a processing system including one or more processors and one or more non-transitory machine-readable storage media for online transaction verification, comprising:
    acquiring, using one or more processors, a status of a commodity on flash sale;
    in response to the commodity on flash sale being purchasable,
        detecting, using the one or more processors, whether a user has logged in;
        in response to the user having not logged in,
            displaying, using the one or more processors, a login interface to prompt the user to log in; and
            uploading, using the one or more processors, authentication information of the user to a server for user authentication;
        acquiring, using the one or more processors, a verification code associated with the commodity on flash sale;
        displaying, using the one or more processors, a first interface for inputting a voice password for flash sale, the first interface displaying the verification code and comprising a button for flash sale;
        recording, using the one or more processors, the voice password for flash sale from a user in response to the button for flash sale being pressed for longer than a pre-determined amount of time;
        uploading, using the one or more processors, the voice password for flash sale to the server for voice recognition, wherein order data is processed by the server in response to the uploaded voice password for flash sale matching with a predetermined verification code and a result related to the order data processing is returned;
        receiving the result;
        outputting the result; and
    in response to the commodity on flash sale not being purchasable, displaying, using the one or more processors, a countdown interface to indicate a time when the commodity becomes purchasable;
    wherein the login interface, the first interface, and the countdown interface are generated by the processing system and data related to the login interface, the first interface, and the countdown interface are stored in the one or more non-transitory machine-readable storage media.

2. The method of claim 1, further comprising:
    detecting whether the commodity on flash sale is sold out;
    in response to the commodity on flash sale being sold out, deactivating the button for flash sale.

3. The method of claim 2, further comprising:
    displaying a detailed description of the commodity on flash sale in response to the button for flash sale being pressed when the button for flash sale is deactivated.

4. The method of claim 1, further comprising:
    in response to the user having logged in, detecting whether the user has set a delivery address; and
    in response to the user having not set a delivery address, prompting the user to set the delivery address.

5. The method of claim 4, wherein the delivery address is pre-stored in the server.

6. The method of claim 1, wherein the countdown interface is closed in response to the button for flash sale being released.

7. A method operating a processing system including one or more processors and one or more non-transitory machine-readable storage media for online transaction verification, comprising:
    predetermining, using one or more processors, a verification code associated with a commodity on flash sale;
    returning, using the one or more processors, a status of the commodity on flash sale based on at least information associated with a first request from a client;
    in response to the commodity on flash sale being purchasable,
        in response to the user having not logged in,
            receiving, using the one or more processors, authentication information of the user uploaded from the client; and
            performing, using the one or more processors, user authentication based on at least information associated with the user authentication information; and
            returning, using the one or more processors, the verification code for display to the user;
    receiving, using the one or more processors, a voice password for flash sale uploaded from the client;
    performing, using the one or more processors, voice recognition;
    in response to the voice password for flash sale matching with the verification code, processing, using the one or more processors, order data;
    returning, using the one or more processors, a result related to the order data processing to the client; and
    in response to the commodity on flash sale not being purchasable, returning, using the one or more processors, a time when the commodity on flash sale becomes purchasable in response to a second request from the client.

8. The method of claim 7, further comprising:
querying a data structure including one or more pre-stored delivery addresses stored in the one or more non-transitory machine-readable storage media to locate a user delivery address; and
processing the order data based on at least information associated with the located user delivery address.

9. The method of claim 7, further comprising:
in response to the commodity on flash sale being sold out, providing a detailed description of the commodity on flash sale in response to a second request from the client, the second request corresponding to a button for flash sale being pressed when the button for flash sale is deactivated.

10. The method of claim 7, further comprising:
receiving a delivery address uploaded from the client; and
processing the order data based on at least information associated with the delivery address.

11. A non-transitory computer readable storage medium comprising programming instructions for online transaction verification, the programming instructions configured to cause one or more data processors to execute operations comprising:
acquiring a status of a commodity on flash sale;
in response to the commodity on flash sale being purchasable,
  detecting whether a user has logged in;
  in response to the user having not logged in,
    displaying a login interface to prompt the user to log in; and
    uploading authentication information of the user to a server for user authentication;
  acquiring a verification code associated with the commodity on flash sale, the verification code being visually displayed to the user;
  displaying a first interface for inputting a voice password for flash sale, the first interface including the verification code and a button for flash sale; and
  recording the voice password for flash sale from a user in response to the button for flash sale being pressed for longer than a predetermined amount of time;
  uploading the voice password for flash sale to the server for voice recognition, wherein order data is processed by the server in response to the uploaded voice password for flash sale matching with a predetermined verification code and a result related to the order data processing is returned;
receiving the result;
outputting the result; and
in response to the commodity on flash sale not being purchasable, displaying a countdown interface to indicate a time when the commodity becomes purchasable.

12. A non-transitory computer readable storage medium comprising programming instructions for online transaction verification, the programming instructions configured to cause one or more data processors to execute operations comprising:
predetermining a verification code associated with a commodity on flash sale;
returning a status of the commodity on flash sale based on at least information associated with a first request from a client;
in response to the commodity on flash sale being purchasable,
  in response to the user having not logged in,
    receiving authentication information of the user uploaded from the client; and
    performing user authentication based on at least information associated with the user authentication information; and
  returning the verification code to enable it to be displayed to the user;
receiving a voice password for flash sale uploaded from the client;
performing voice recognition;
in response to the voice password for flash sale matching with the verification code, processing order data;
returning a result related to the order data processing to the client; and
in response to the commodity on flash sale not being purchasable, returning a time when the commodity on flash sale becomes purchasable in response to a second request from the client.

13. A system for online transaction verification, comprising:
one or more data processors; and
one or more non-transitory computer-readable storage media encoded with instructions for commanding the data processors to execute operations including:
  acquiring a status of a commodity on flash sale;
  in response to the commodity on flash sale being purchasable,
    detecting whether a user has logged in;
    in response to the user having not logged in,
      displaying a login interface to prompt the user to log in; and
      uploading authentication information of the user to a server for user authentication;
    acquiring a verification code associated with the commodity on flash sale;
    displaying a first interface for inputting a voice password for flash sale, the first interface displaying the verification code and comprising a button for flash sale and
    recording the voice password for flash sale from a user in response to the button for flash sale being pressed longer than a pre-determined amount of time;
    uploading the voice password for flash sale to the server for voice recognition, wherein order data is processed by the server in response to the uploaded voice password for flash sale matching with a pre-determined verification code and a result related to the order data processing is returned;
  receiving the result;
  outputting the result; and
  in response to the commodity on flash sale not being purchasable, displaying a countdown interface to indicate a time when the commodity becomes purchasable.

14. A system for online transaction verification, comprising:
one or more data processors; and
one or more non-transitory computer-readable storage media encoded with instructions for commanding the data processors to execute operations including:
  predetermining a verification code associated with a commodity on flash sale;
  returning a status of the commodity on flash sale based on at least information associated with a first request from a client;

in response to the commodity on flash sale being purchasable,
  in response to the user having not logged in,
    receiving authentication information of the user uploaded from the client; and
    performing user authentication based on at least information associated with the user authentication information; and
  returning the verification code to enable it to be displayed to the user;
receiving a voice password for flash sale uploaded from the client;
performing voice recognition;
in response to the voice password for flash sale matching with the verification code, processing order data;
returning a result related to the order data processing to the client; and
in response to the commodity on flash sale not being purchasable, returning a time when the commodity on flash sale becomes purchasable in response to a second request from the client.

\* \* \* \* \*